April 14, 1964  D. H. McKEOUGH ETAL  3,129,309
TEMPERATURE-COMPENSATED PRESSURE SWITCHES FOR
CONTROLLING GAS BLAST CIRCUIT INTERRUPTERS
Filed April 12, 1960                                             6 Sheets-Sheet 1

WITNESSES:
Bernard R. Gieguer
James F. Young

INVENTORS
Daniel H. McKeough and
Karl K. Franz.
BY
Willard R. Crout
ATTORNEY

United States Patent Office 3,129,309
Patented Apr. 14, 1964

3,129,309
TEMPERATURE - COMPENSATED PRESSURE
SWITCHES FOR CONTROLLING GAS BLAST
CIRCUIT INTERRUPTERS
Daniel H. McKeough, Burlington, Ontario, and Karl K.
Franz, Hamilton, Ontario, Canada, assignors to Canadian Westinghouse Company, Limited, Hamilton,
Ontario, Canada
Filed Apr. 12, 1960, Ser. No. 21,681
5 Claims. (Cl. 200—148)

This invention relates, generally, to temperature-compensated pressure switches for controlling gas blast circuit interrupters and, more particularly, to a constant-density control switch adaptable for controlling the density of a gaseous fluid in a gas blast circuit interrupter throughout a desired temperature range.

An object of the present invention is to provide an improved constant-density gas control switch adaptable for controlling, or measuring, the density of a gaseous fluid within a gas-blast circuit-interrupter system, wherein the fluid density does not vary directly with either its temperature or pressure within limits suitable for effective control or measurement.

Another object of the invention is to provide an improved constant-density gas control device for a gaseous system associated with a gas-type circuit-interrupting structure, wherein the effectiveness of the interrupting performance of the utilized gas in dependent, at least in part, upon its density; and variations in the temperature of the interrupting structure throughout a rather wide ambient temperature range are contemplated.

A more particular object of the present invention is to provide an improved constant-density gas control switch for a sulfur-hexafluoride ($SF_6$) gas-type of circuit-interrupter.

In United States patent application filed January 23, 1959, Serial No. 788,668, now United States Patent 3,057,-983, issued October 9, 1962, to Benjamin P. Baker, Russell N. Yeckley and Joseph Sucha, and assigned to the Westinghouse Electric Corporation, there is disclosed and claimed a novel gaseous-type circuit-interrupting structure utilizing a dual-pressure, closed-cycle system, in which it is desired to utilize an interrupting gas at high-pressure, exhausting this gas, following interruption, into a low-pressure system, and to provide a compressor, which functions to recompress the relatively low-pressure gas, and force it under high-pressure back into the high-pressure system. The circuit-interrupter of the foregoing patent application is of the sulfur-hexafluoride ($SF_6$) gas-type, and the interrupting effectiveness of the gas is dependent upon the differential pressure between the low and high-pressure systems, as well as upon the density of the sulfur-hexafluoride gas. It is, therefore, necessary to accurately control the operation of the compressor, when the pressure of the sulfur-hexafluoride gas in the high-pressure system drops below a desired level. It is, therefore, an important object of the present application to provide a temperature-compensated gas pressure control switch, suitable for accurately retaining control over the density of either the high or low-pressure systems in the foregoing gas-type circuit-interrupting structure, throughout a rather wide ambient temperature range.

Further objects and advantages will readily become apparent upon reading the following specification, taken in conjunction with the drawings, in which.

The present invention is concerned with a gas control device, which controls, or measures, the density of gaseous fluid within a gas system of a dual-pressure gas-type circuit interrupter, wherein the gaseous fluid density does not vary directly with either its temperature or pressure within limits suitable for effective control or measurement.

A typical system of this nature is that described in the aforesaid Yechley et al. Patent 3,057,983, wherein the density of the gaseous sulfur-hexafluoride ($SF_6$) cannot be measured, or controlled effectively by either its temperature or pressure alone. Such a system may require control of compressor operation, and/or alarm indication. If standard pressure switches are used for the control of compressor operation, there is no control of density, and at high ambient temperatures, the weight of gas in the controlled volume may actually be much less than at low temperatures, even though this fact is not reflected in a decrease of pressure. If standard pressure switches are used, for say low-pressure alarm indication, they would have to be set below the normal operating pressure at the lowest expected ambient temperature; and the spread between normal operating pressure and the constant-pressure switch setting would be so great at the higher ambient temperatures, as to make alarm indication almost useless.

Figure 1:
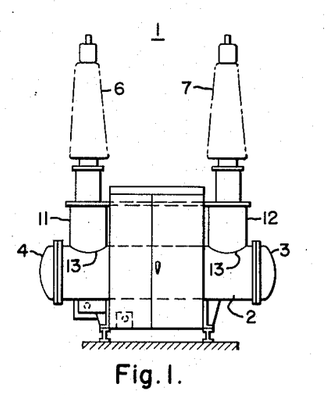
FIGURE 1 is a front end elevational view of a gas-type circuit-interrupting structure, in this particular instance one of the gaseous sulfur-hexafluoride type, utilizing the temperature-compensated gas pressure control switches of the present invention as a part of the gas control system thereof.
Figure 3:
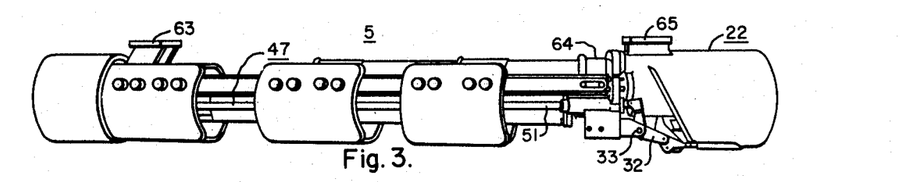
FIG. 3 is a perspective view, in side elevation, of the arc-extinguishing assemblage removed from the tank structure, the parts being illustrated in the open-circuit position.

For an example of an application of the gas control device of the present invention to a gas system of a dual-pressure gas-type circuit interrupter, in which density measurement and control is exceedingly important, reference may be had to FIG. 1, wherein the reference numeral 1 generally designates a circuit-interrupting structure including a generally horizontally-extending tank structure 2. Hinged closure heads 3, 4, hinged to the tank structure 2, permit the lateral withdrawal of an arc-extinguishing assemblage, generally designated by the reference number 5, and shown in perspective in FIG. 3 of the drawings.

As shown in FIG. 1, a pair of spaced, upstanding terminal bushings 6 and 7 are supported upon upwardly extending cylindrical mounting sleeves 11, 12, secured, as by welding 13, to the horizontally extending tank structure 2.

Figure 2A:
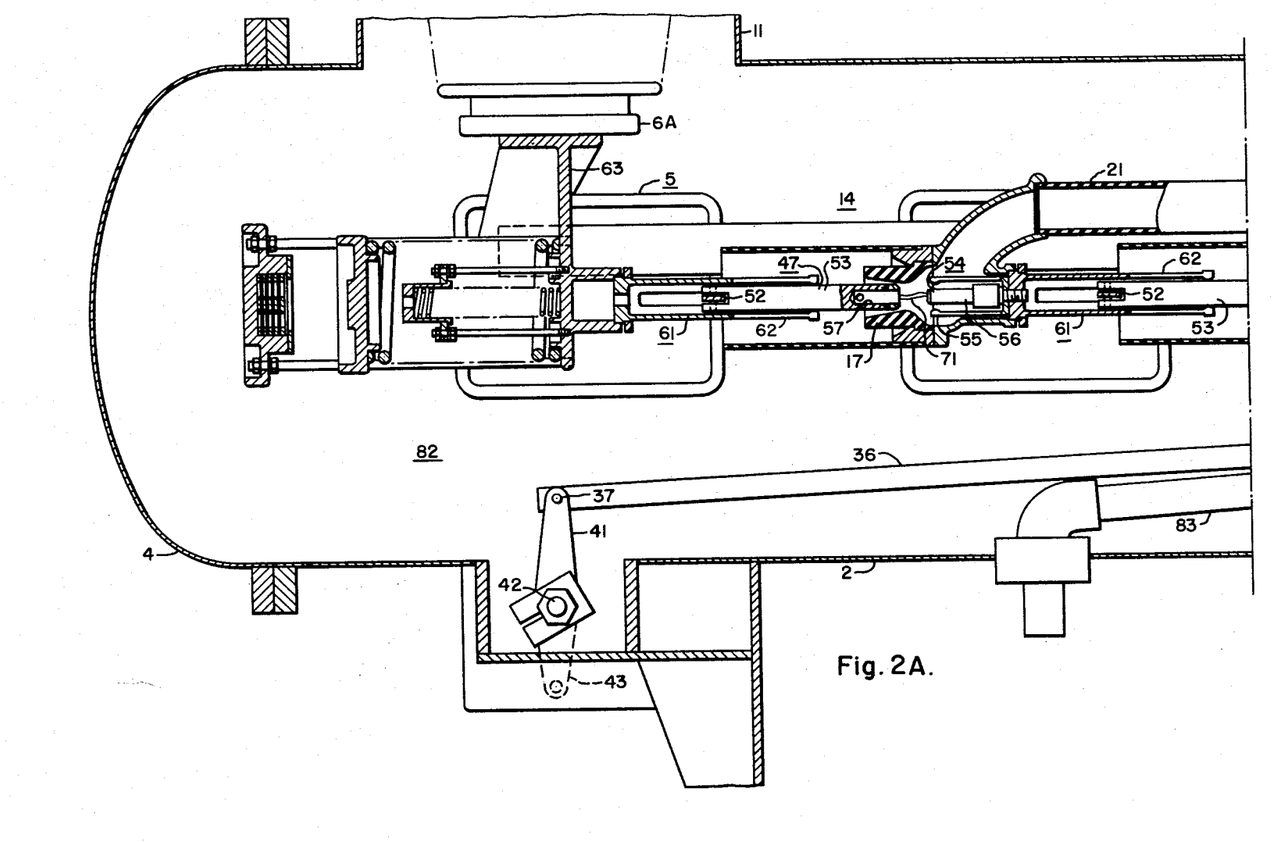
FIGS. 2A and 2B collectively illustrate, on an enlarged scale, in vertical cross-section, the enclosed arc-extinguishing assemblage disposed interiorly within the grounded tank structure, electrically bridging the lower ends of the terminal bushings, and the contact structure being illustrated in the partially open-circuit position.
Figure 2B:
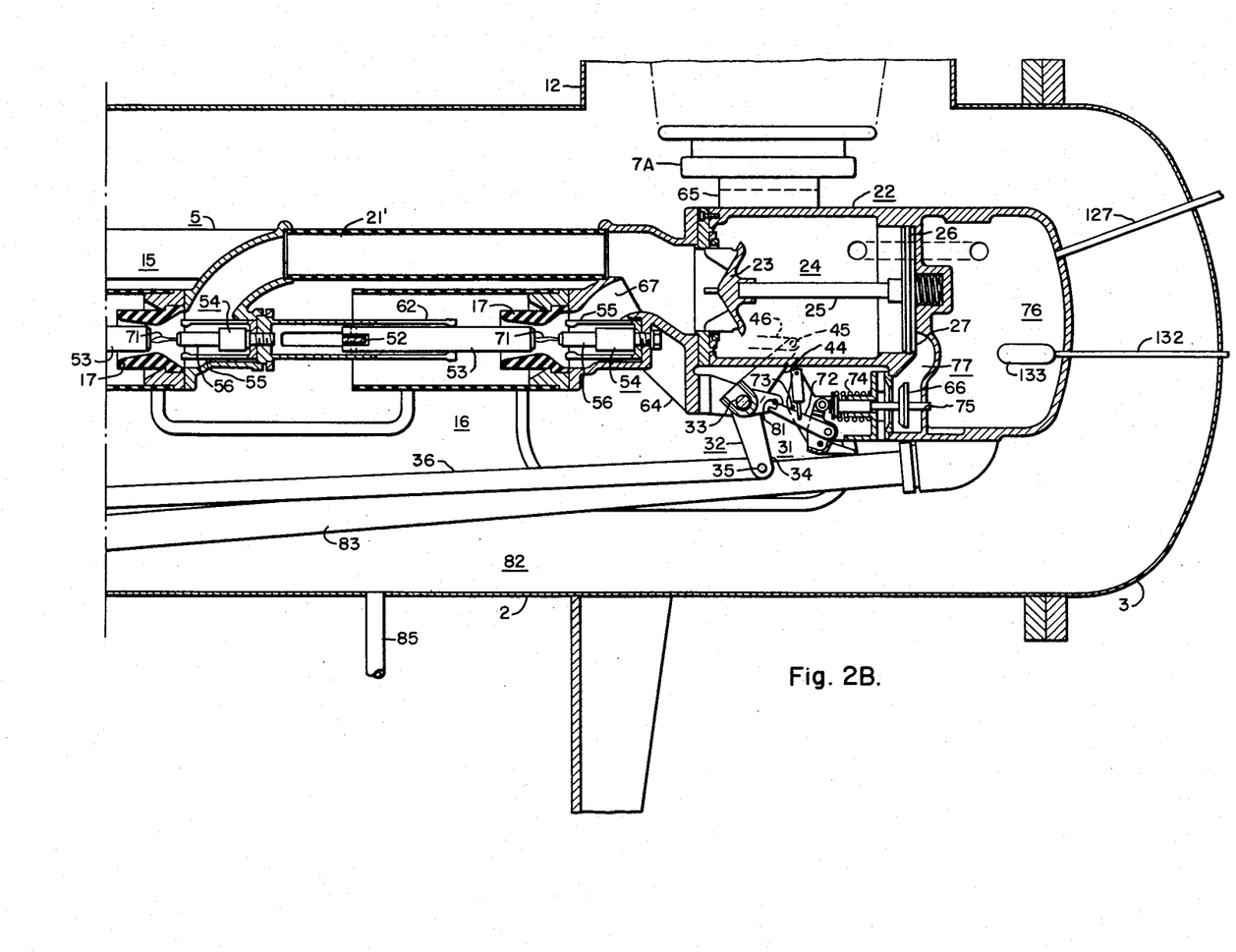

Depending from the lower interior ends 6A, 7A of the terminal bushings 6, 7, as shown more clearly in FIGS. 2A and 2B, is the arc-extinguishing assemblage 5.

With reference to FIGS. 2A and 2B, it will be observed that the elongated arc-extinguishing assemblage 5 includes a plurality, in this particular instance three, arc-extinguishing units 14, 15 and 16. These arc-extinguishing units 14—16 are of the orifice type, and include stationary orifice structures 17, through which high-pressure gas is forced by means of blast tubes 21, 21' from a high-pressure reservoir tank, or reservoir means, generally designated by the reference number 22.

A blast valve 23 controls the blasting of gas out of the region 24 within the high-pressure reservoir tank 22. As shown in FIG. 2B, the blast valve 23 is connected by a piston rod 25, to an actuating piston 26. The high-pressure gas, which normally exists on both sides of the actuating piston 26, may be dumped, or exhausted, from its back side 27 by the actuation of a pilot-valve assembly, generally designated by the reference numeral 31, and the operation of which is described in the aforesaid Baker et al. patent application.

The pilot-valve assembly 31 is actuated by a main actuating lever, generally designated by the reference numeral 32, and stationarily pivotally supported upon a fixed shaft 33. The main actuating lever 32 has an integral arm 34, which is pivotally connected, as at 35, to a diagonally extending insulating operating rod 36. As shown in FIG. 2A, the left-hand of the insulating operating rod 36 is pivotally connected, as at 37, to a rotatably mounted crank-arm 41, clamped to a rotatable hexagonal shaft 42, which is actuated, through a gas-tight seal, by means of an externally disposed crank-arm 43.

The main actuating lever 32, in addition, has a pair of integral arms 44 (only one of which is shown in FIG. 2B), which are pinned as at 45, to a pair of links 46. The links 46 are employed to effect the horizontal, reciprocal motion of a generally ladder-shaped movable contact assemblage, generally designated by the reference numeral 47, and including a pair of parallel-disposed, insulating, movable operating rods 51 (FIG. 3) having cross-bars 52 to the centers of which are fixedly secured the three movable rod-shaped contacts 53.

The three movable rod-shaped contacts 53 make contacting engagement with relatively stationary contact structures, generally designated by the reference numeral 54, and including resilient stationary fingers 55 and stationary arcing horns 56, which protrude within an end tubular portion 57 (FIG. 2A) of the movable contacts 53.

The stationary contact structures 54, in addition, include a rearwardly extending contact-finger assembly, generally designated by the reference numeral 61, and including resilient spring fingers 62, which bear laterally upon the sides of the rod-shaped movable contacts 53.

From the foregoing description, it will be apparent that in the closed-circuit position of the interrupter 1 the electrical circuit extending through the arc-extinguishing assemblage 5 includes the casting 63, left-hand contact-finger assembly 61, through the spring fingers 62 thereof to left-hand movable contact 53. The circuit then extends through stationary contact structure 54, through spring fingers 62, and onward, in similar manner, to the right-hand stationary contact structure 54. The electrical circuit then extends through an end casting 64, through reservoir tank 22 to right-hand support casting 65.

During the opening operation, the rotation of operating shaft 42 will effect, through the insulating operating rod 36, counterclockwise rotatable motion of the main actuating lever 32. This will not only effect leftward opening movement of the ladder-shaped movable contact assemblage 47, separating the several contacts 53, 55, but also it will effect opening of the pilot-valve 66, and consequently exhausting of high-pressure gas from the back side 27 of piston 26 to thereby effect opening of the main blast valve 23.

The cross-sectional area of piston 26 is larger than the cross-sectional area of blast valve 23, so the high-pressure gas, present within region 24, will act to move piston 26 to the right, as viewed in FIG. 2B, opening the blast valve 23.

The opening of blast valve 23 will permit the blasting of high-pressure gas out of the high-pressure reservoir tank 22, through passage 67 and blast tubes 21, 21' and through the several orifice structures 17. The several arcs 71, which are drawn between the arc horns 56 and movable contacts 53, will be extinguished by the blast of this high-pressure gas. The circuit will thus be interrupted, and the engagement of a pilot-valve latch 72 with a stop member 73, will permit a compression spring 74 to effect reclosing of pilot-valve 66. This will open an opening 75 in high-pressure chamber 76, constituting a portion of reservoir tank 22, to again raise the pressure within region 77 in back of actuating piston 26. The high-pressure gas present within region 24 will then effect reclosure of the blast valve 23 for the reason given above.

To close the circuit-interrupter 1, the operating shaft 42 is rotated in a counterclockwise direction to effect, through the operating rod 36, the clockwise rotation of main actuating lever 32. This will not only effect rightward motion of the ladder-shaped movable contact assemblage 47, but also relatching of the pilot-valve latch 72 with a thrust pin 81, as described in the aforesaid Baker et al. patent application.

From the foregoing description it will be apparent that there is a low-pressure region 82 within the tank structure 2, and a high-pressure reservoir tank 22, including the regions 24 and 76. To replenish the high-pressure gas used from the high-pressure tank 22, an insulating supply line 83 supplies gas to the high-pressure tank 22 from an auxiliary high-pressure reservoir 84 at ground potential.

A low-pressure connection 85 (FIG. 2B), connects, through a hand valve 86 (FIG. 6), to a filter 87. A compressor 91 is employed to draw the low-pressure gas through a hand valve 92, and recompresses it to a high-pressure, in which state it is forced upwardly through opened hand valve 93, and back through the auxiliary high-pressure reservoir 84. A hand valve 94 is closed during normal operation of the interrupter. A relief valve 95 governs the differential pressure between the low and high-pressure systems to prevent overload of the compressor 91, and to prevent excessive buildup of pressure in the high-pressure system in case of compressor control failure. The valves 96, 97 and 101 are normally closed. A heater 102 is employed to heat the high-pressure gas within reservoir tank 84, so that the temperature thereof never drops below 42° F. The heater is controlled by a thermostat 103.

Figure 6:
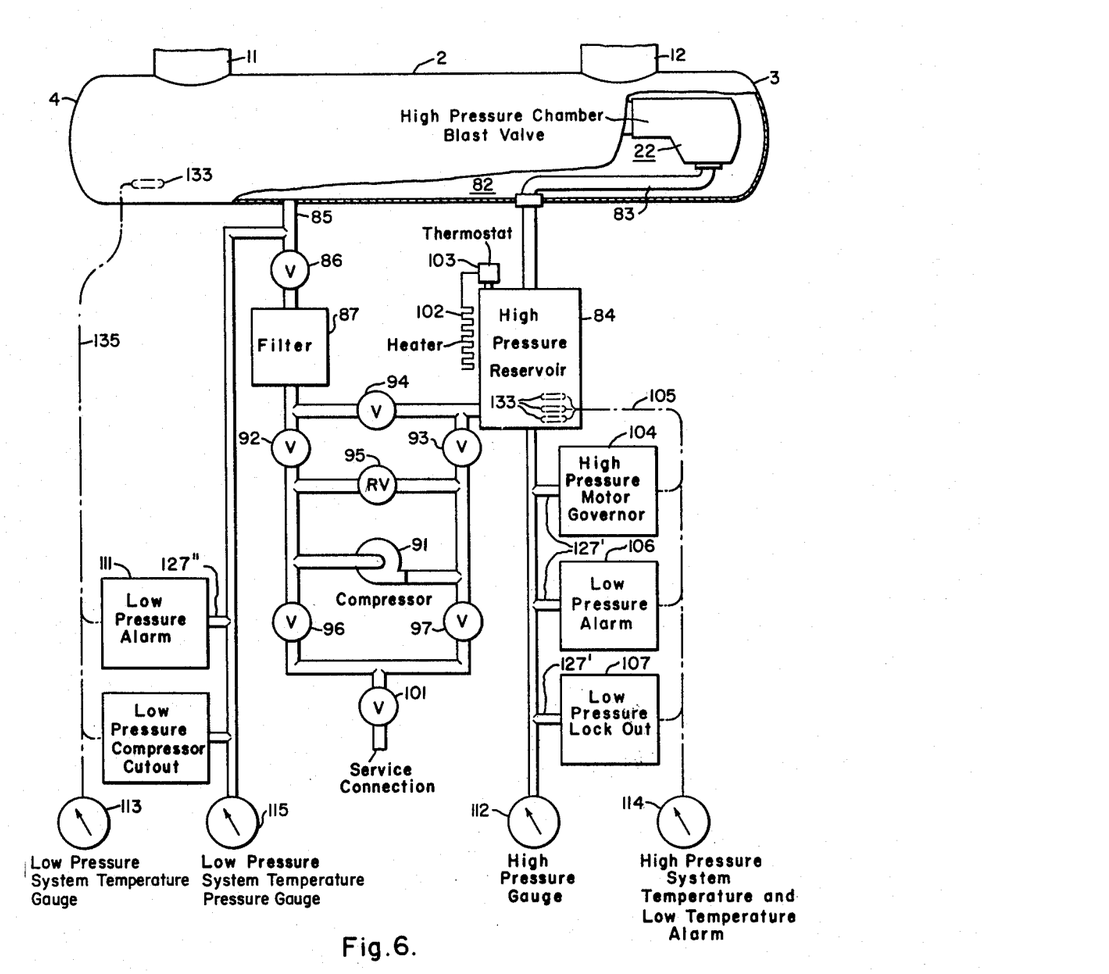
FIG. 6 is a schematic diagram of the dual-pressure, closed-cycle, gas-control system employed in connection with the circuit-interrupting structure in FIGS. 2A and 2B, utilizing gas control devices of the type described in the present invention.

A temperature-compensated, high-pressure motor-governor switch 104 governs the energization of compressor motor 91 dependent upon the pressure within high-pressure reservoir 84. The temperature compensating thermal connection 105, the function of which is described hereinafter, permits control of the density within the high-pressure reservoir 84. Similarly, a high-pressure system, low-pressure alarm switch 106 is provided, as is a high-pressure system lockout switch 107, which prevents breaker operation, should the high-pressure reservoir pressure fall below 160 p.s.i.g. Normally, the high-pressure value is 200 p.s.i.g. within reservoir tanks 22, 84. The low-pressure within region 82 of tank 2 is normally 30 p.s.i.g.

A temperature-compensated, low-pressure system, low-pressure alarm switch 111 is provided to sound an alarm should the pressure within the low-pressure system fall to a minimum low value, at which the dielectric strength between the extinguishing assemblage 5, at high voltage, and the grounded tank structure 2, would be seriously impaired.

In addition to the foregoing temperature-compensated control switches 104, 106, 107 and 111, there are provided two pressure gauges 112, 113 and two temperature gauges 114, 115.

Figure 4:
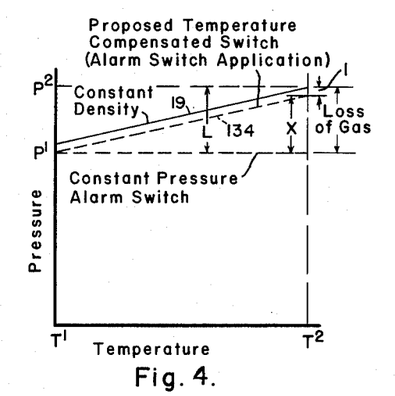
FIG. 4 is a graph showing the pressure-versus-temperature variation of a gas used for interrupting purposes, illustrating the necessity for employing the temperature-compensated gas pressure control switch of the present invention to obtain accurate control over the gas density at the higher ambient temperatures.

As mentioned previously, the interrupting effectiveness of the high-pressure sulfur-hexafluoride ($SF_6$) gas is dependent not only upon the differential pressure between the high and low-pressure systems, but also upon its density. It is, therefore, necessary, for effective interrupting operation, to measure, and to control the density of the sulfur-hexafluoride ($SF_6$) gas. With reference to the sulfur-hexafluoride ($SF_6$) pressure-versus-temperature variation graph of FIG. 7, it will be noted that there are shown operational lines of constant specific volumes. Each of these lines represents a constant specific volume (reciprocal of density). The operating line 116 designates, for example, the pressure in the high-pressure system at various ambient temperatures prior to any breaker operation. This may be called a line of first normal operation. The line 117 indicates a second normal operation, or the drop of pressure in the high-pressure system following a single opening operation. The pressure in the high-pressure gas system is thus arranged for two instantaneous circuit-breaker opening operations. Obviously, during a circuit-breaker opening operation, the gas is depleted within the high-pressure system, and the pressure within the low-pressure system is slightly increased. It is, therefore, necessary to effect compressor operation 91 to bring about a reestablishment of the initial pressure conditions within the two gas systems. As mentioned previously, if standard pressure switches are used for say low-pressure alarm indication, as indicated in FIG. 4, they would have to be set below the normal operating pressure $P^1$ at the lowest expected ambient temperature $T^1$, and the spread L between the normal operating pressure $P^2$ and the constant-pressure switch setting $P^1$ would be so great at the higher ambient temperature $T^2$, as to make alarm indication almost useless.

In the conventional standard pressure switch, the pressure connection provides a force, which is opposed by a constant spring force in the control, and the switch is actuated when one force is greater than the other. It is proposed, in the present invention, to replace the constant spring force with a force varying with the temperature of the controlled volume, so that the pressure required, in the controlled volume, to actuate the switch at any temperature is always equal to the pressure which would exist in a constant volume of the gas at a fixed density at the same temperature.

Figure 5:
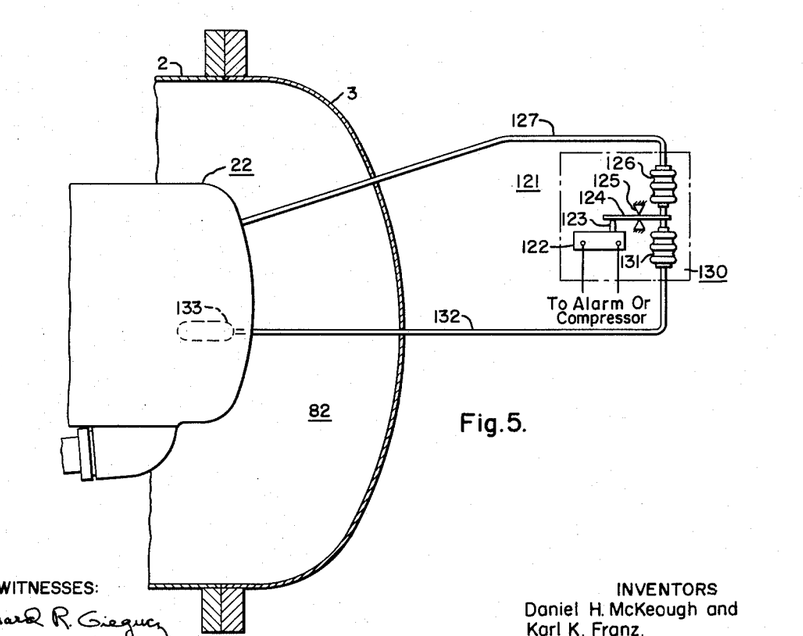
FIG. 5 fragmentarily illustrates, on an enlarged scale, and somewhat diagrammatically, the temperature-compensated gas pressure switch of the present invention, as applied to obtain the effective control over the density of the gas in the high-pressure reservoir chamber, disposed at one end of the arc-extinguishing assemblage of FIG. 2B.

As indicated in FIG. 5, a temperature-compensated gas pressure control switch, generally designated by the reference numeral 121, includes a switch 122, which might be a normally-open, small, snap-acting switch, whose actuating plunger, or control arm 123 makes engagement with a pivotally-mounted lever arm 124, having a stationary fulcrum at 125. The right-hand end of the pivotally-mounted lever arm 124 is in engagement with a metallic bellows 126, or pressure-responsive means, which has a pressure connection 127, which leads into the controlled volume, such as the high-pressure reservoir tank 22. Abutting the rear side of the right-hand end of the pivotally-mounted lever arm 124 is a second bellows 131, which has a tubular connection 132 with a thermal bulb 133 disposed interiorly within the high-pressure tank 22, or in temperature-responsive relation thereto, so as to be responsive to the temperature of the controlled volume 22. The thermal bulb 133 and the thermal connecting tube 132, together with bellows 131 may be filled with the same gaseous fluid, which is in the controlled volume 22. In addition, the density of the gaseous fluid within the temperature-measuring bulb 133 is at the desired density level. As a result, the pressure of the standard fluid, within temperature-responsive bulb 133, varies in accordance with the dotted constant-density line 134 in FIG. 4. It will be observed, upon an inspection of FIG. 4, that the pressure exerted by the fluid within bulb 133 increases, as the ambient temperature rises from ambient temperature $T^1$ to ambient temperature $T^2$, so that a spread of only the small pressure difference, denoted by the pressure difference 1, is necessary, at the higher ambient temperature $T^2$, to effect the actuation of the temperature-responsive control switch 121. Thus, a decrease of pressure within pressure connection 127 would result in rotation of control arm 124, and consequent closing of the contacts, not shown, disposed within switch 122. This would start compressor operation, or sound an alarm, as desired.

Although it may be preferable, for certain applications to employ the same gaseous fluid within the temperature-responsive bulb 133, as is present within the controlled volume 22, neverethless, it is within the contemplation of the present invention, for this and other applications, to employ, instead of the same gaseous fluid, another fluid, which may be either a liquid or a gas. If a liquid fill is used, its boiling and freezing points should be outside the operating temperature range, and its coefficient of volumetric expansion should be relatively constant over this range. If a gaseous fill is used, the slope of its pressure-temperature curve may, or may not be parallel to the pressure-temperature curve of the controlled gaseous fluid at its controlled density. If the curves are parallel, but not coincident, then a simple lever arm, such as 124 in FIG. 5 may be used, and the areas of the bellows 131 adjusted to balance the opposing forces. If a liquid is used or a gas whose pressure-temperature curve is not parallel with that of the controlled fluid, then the lever arm 124 may be replaced with a suitable linkage whose function it is to equalize the net effective travel of the bellows elements, 126 and 131, over the temperature limits selected, provided that the density of the controlled fluid does not change.

Referring back to FIG. 6, the dot-dash line 105 indicates collectively a plurality of thermal connections 132 leading into the high-pressure reservoir 84, similar to the thermal connection 132 of FIG. 5. More specifically, there would be three thermal lines, collectively constituting the dot-dash line 105, for providing temperature compensation, or thermal connections, for each of the switches 104, 106, 107. In other words, each of the temperature-compensated switches 104, 106 and 107 would have its own separate bulb connection 133 within high-pressure reservoir 84 for measurement of the density condition therein.

Moreover, the temperature-compensated, low-pressure system, low-pressure alarm switch 111 may have a similar thermal connection 135, which would lead to a temperature-responsive bulb 133, disposed within the interior 82 of the tank structure 2, as indicated in FIG. 6 of the drawings. The pressure connections for all the control switches 104, 106, 107 and 111 are indicated by the reference numeral 127', 127''. Thus, temperature-compensated pressure switches, of the type indicated at 121 of FIG. 5, can be used for both the high-pressure system and also for the low-pressure system, to accurately control and measure the density of the fluid within these two systems.

Figure 7:
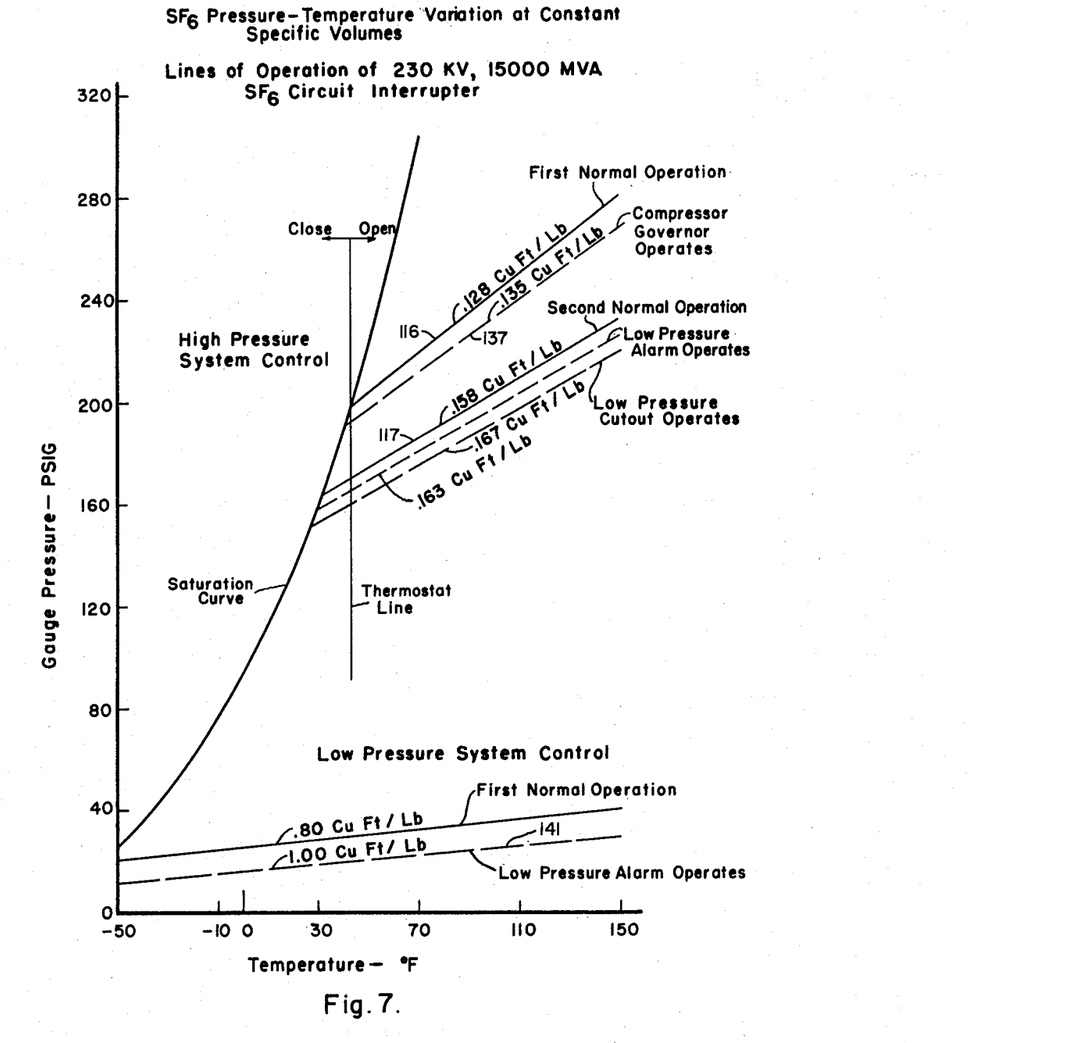
FIG. 7 is a graph indicating the sulfur-hexafluoride ($SF_6$) gas pressure-versus-temperature variations, at constant specific volumes, of the operating conditions utilized in connection with the operation of the dual-pressure type of circuit-interrupter of FIG. 1, as controlled by the temperature-compensated gas pressure control switches of the present invention; and, FIGS. 8–10 illustrate modified types of temperature-compensated gas pressure control switches utilizing the principles of the present invention.

The constant density line 137 in FIG. 7 indicates the setting of the compressor-governor switch 104 of FIG. 6. That is, the switch 122, associated with governor switch 104 will close its contacts to start the compressor 91, when the pressure within auxiliary tank 84 drops below the pressure line 137. Similarly, the constant density line 141 of FIG. 7 indicates the constant-density setting of the low-pressure system, low-pressure alarm switch 111 of FIG. 6.

From the foregoing description, it will be apparent that there is provided an improved temperature-compensated pressure switch having a thermal connection 132, which can be designed to provide a force to oppose that of the pressure connection 127, equal to the force, which should result from the pressure in the controlled vessel, if it is filled with fluid to the desired density, and the temperature is then varied. So long as the pressure in the controlled vessel 22 is what the thermal connection 132 indicates that it should be, the switch 121 does not operate, but if the pressure in the vessel 22 is less than that of the thermal element 133, the switch 121 will be actuated to close the compressor circuit, or initiate alarm indication as required.

Therefore, if the controlled vessel 22 is filled to a desired density at any temperature, the temperature can subsequently be varied within limits designed into the switch 121 without actuating the switch 121. The switch 121 will only be actuated upon decrease of density, as caused by a loss of gas.

As mentioned, it is not necessary to use the same gas at the same density as is present in the controlled volume 22 for the fluid interiorly of the thermal bulb 133. A suitable liquid may be used. In fact, a number of liquids may be used with good success provided that they have the properties of freezing point, boiling point, and co-efficient of volumetric expansion as set forth above. Typical liquids would be trichloroethylene and toluene.

Figures 8, 9, 10:
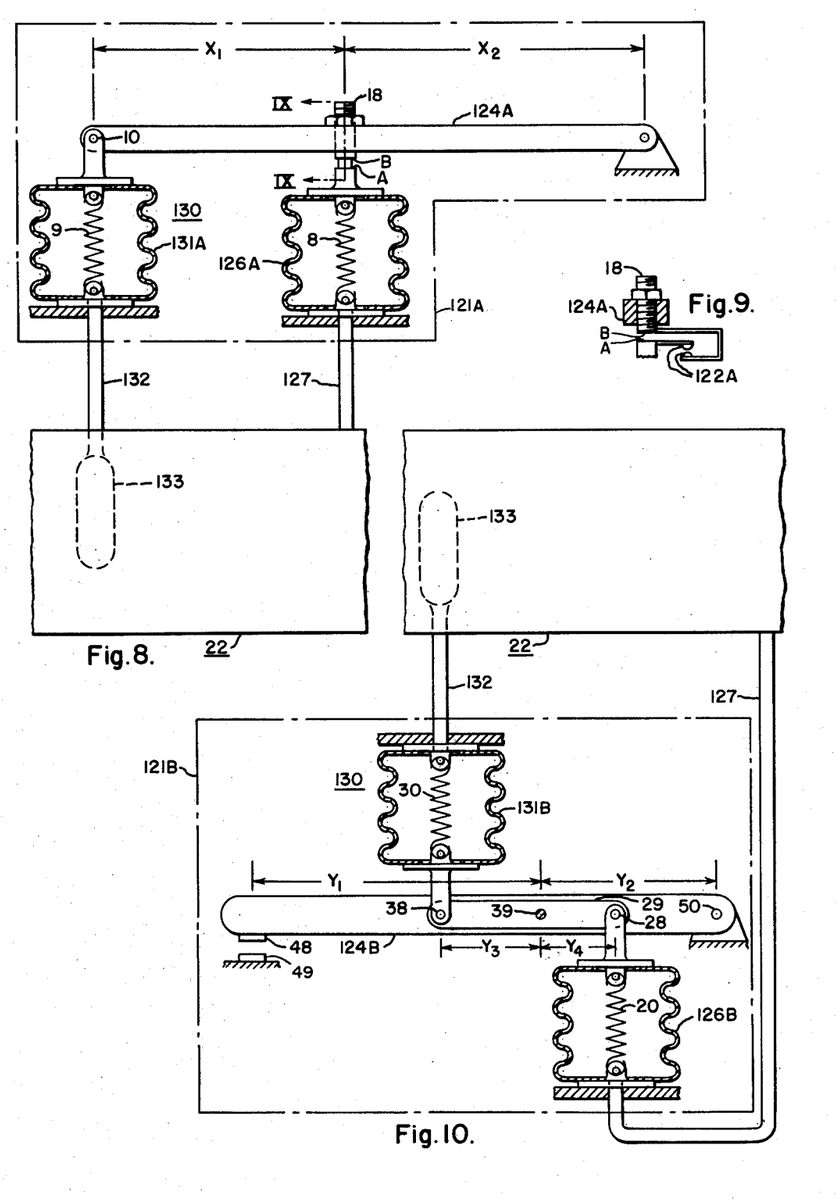

Referring to FIG. 8, assume that sulfurhexafluoride gas $SF_6$ at the correct density is contained in the high-pressure tank 22. A connection 127 leads to the pressure element 126A which works against a spring 8. The location of point A inside the switch case (not shown) is always determined by the density of $SF_6$ in tank 22, the temperature of the $SF_6$ in tank 22 (which determines its pressure), the effective area of bellows 126A and finally the spring characteristics of spring 8.

The temperature-sensitive bellows 131A, its bulb 133 and connecting tube 132 are filled with a suitable liquid, such as toluene or trichloroethylene. The location of point B inside the switch case (not shown) depends upon the coefficient of volumetric expansion of the liquid, the volume inside the system comprised of items 131A, 132, 133, the temperature of the liquid, and the effective area of the bellows 131A. The spring 9 is only used to force the bellows pivot 10 to follow the contraction of the liquid more closely and has no practical effect upon the location of point B because the liquid is relatively incompressible.

Correct temperature-compensation of the switch is achieved when the same relative position of points A and B is maintained at all temperatures within the range, provided that the density of $SF_6$ within the tank 22 does not change. It may be seen that this can be accomplished by adjusting any one, or any combination of the following: $X_1$, $X_2$, the spring characteristic of spring 8, the effective area of bellows 126A, 131A, the volume of the liquid used in the temperature-sensitive element 133, and the coefficient of volumetric expansion of that liquid.

The location of the pivot point 10 may be adjustable, and also the screw 18 may be adjustable to move point B relative to point A. In effect, the former changes the slope of line 134 in FIG. 4, and the latter changes the height of this line on the graph of FIG. 4.

FIG. 10 shows schematically another modified type of switch 121B, which accomplishes correct temperature-compensation even though the temperature-sensing element 131B is filled with a liquid, or a gas whose pressure-temperature curve is not parallel to that of the controlled gas, such as line 19 of FIG. 4.

The controlled gas in tank 22 of FIG. 10 acts upon the bellows 126B against the spring 20 to determine the relative position of the pivot 28 in the balancing lever 29 with respect to the switch case. The fluid in the temperature-sensitive bellows 131B, the bulb 133 and connecting tube 132 acts against the spring 30 to determine the relative position of the pivot 38 in the balancing lever 29 with respect to the switch case. The position of pivot point 39, about which balancing lever 29 rotates on the main lever 124B, with respect to the switch case is determined by the positions of points 28 and 38. Consequently, the position of contact 48 relative to contact 49 is also determined by the positions of pivots 28, 38, since the main lever 124B is constrained to rotate about pivot point 50.

If the temperature-sensing element 133 of FIG. 10 is liquid-filled, then the spring 30 is relatively ineffective in determining the position of pivot 38 because the liquid is relatively incompressible, and the position of pivot 38 is determined by the volume of items 131B, 132 and 133, the temperature of the system, the coefficient of volumetric expansion of the liquid and the effective area of the bellows 131B.

If the thermal bulb of FIG. 10 is filled with gas, the position of pivot 38 is determined by the gas density, the temperature, the pressure-temperature curve of the gas, the effective area of bellows 131B and the characteristics of spring 30.

The position of pivot 28 depends upon the temperature and density of the gas in the controlled volume 22, its temperature-pressure curve, the effective area of bellows 126B and the characteristics of spring 20. It may be seen that by adjusting various combinations of the above, or by adjusting the ratio of $Y_3$ to $Y_4$ the switch may be temperature-compensated since point 39 will remain fixed relative to the switch case provided that the temperature of the fluid in items 131B, 132 and 133 remains the same as that of the fluid in tank 22, and the density of the fluid in controlled tank 22 does not change.

From the foregoing description of the invention it will be observed that the bulb 133 and the connecting tubes to the bellows 131, 131A, 131B constitute a temperature-compensating means for ensuring that the compressor or alarm will be actuated only upon loss of the controlled gas.

Although there have been illustrated and described specific constant-density control devices, which, for purposes of illustration, have been shown as applied to a gas blast interrupting structure utilizing such devices, it it to be clearly understood that the same were merely for the purpose of illustration, and that changes and modifications may be readily made therein by those skilled in the art without departing from the spirit and scope of the invention. Also such a constant-density control device may be used in connection with any gaseous system, control of the density of which may be desired over a particular temperature range.

We claim as our invention:

1. A dual-pressure closed-cycle-system compressed-gas circuit interrupter operable over a relatively wide ambient temperature range including a tank structure having a pair of terminal bushings extending therein, an arc-extinguishing assemblage including separable contact means disposed within the tank structure and at least partially supported by the interior ends of the terminal bushings, a high-pressure tank associated with said arc-extinguishing assemblage, blast-valve means synchronized with the separation of said separable contact means to release a blast of gas from said high-pressure tank to assist in arc extinction, the exhausted gas collecting within the general interior of said tank structure, the tank pressure being lower than the pressure within said high-pressure tank, the interrupting ability of the circuit interrupter being dependent upon both the pressure and density of the stored gas, the pressure-temperature characteristics of the interrupting gas causing an increased pressure of the gas at the higher ambient operating temperatures, compressor means for recompressing the exhausted gas within the tank structure and forcing the recompressed gas back into the high-pressure tank for subsequent opening operations of the interrupter, gas-pressure control means including a constant-density gas-control switch for sensing the density of the interrupting controlled gas over said relatively wide ambient temperature range and for regulating the operation of said compressor means, said switch having a pair of cooperable contacts at least one of which is movable, a movable switch member for actuating said one movable switch contact, pressure-responsive means including a pressure connection leading to the high-pressure tank for urging motion of said movable switch member to close the switch contacts upon a drop of pressure of the controlled gas, temperature-compensating means for said pressure-responsive means for providing a lower pressure spread at the higher ambient temperatures to effect switch contact closure than would otherwise be obtained by mere use of a constant pressure switch, said temperature-compensating means including a thermal bulb disposed in temperature-responsive relation with the controlled gas, said thermal bulb containing a fluid having a pressure-temperature characteristic curve or a volumetric expansion-temperature curve suitable for the desired rapid compensating response at the higher ambient temperatures, whereby pressure and density control of the interrupting gas is obtained over the relatively wide ambient temperature range for effective interrupter operation.

2. A dual-pressure closed-cycle-system compressed-gas circuit interrupter operable over a relatively wide ambient temperature range including a tank structure having a pair of terminal bushings extending therein, an arc-extinguishing assemblage including separable contact means disposed within the tank structure and at least partially supported by the interior ends of the terminal bushings, a high-pressure tank associated with said arc-extinguishing assemblage, blast-valve means synchronized with the separation of said separable contact means to release a blast of gas from said high-pressure tank to assist in arc extinction, the exhausted gas collecting within the general interior of said tank structure, the tank pressure being lower than the pressure within said high-pressure tank, the interrupting ability of the circuit interrupter being dependent upon both the pressure and density of the stored gas, the pressure-temperature characteristics of the interrupting gas causing an increased pressure of the gas at the higher ambient operating temperatures, compressor means for recompressing the exhausted gas within the tank structure and forcing the recompressed gas back into the high-pressure tank for subsequent opening operations of the interrupter, gas-pressure control means including a constant-density gas-control switch for sensing the density of the interrupting controlled gas over said relatively wide ambient temperature range and for regulating the operation of said compressor means, said switch having a pair of cooperable contacts at least one of which is movable, a movable switch member for actuating said one movable switch contact, pressure-responsive means including a pressure connection leading to the high-pressure tank for urging motion of said movable switch member to close the switch contacts upon a drop of pressure of the controlled gas, temperature-compensating means for said pressure-responsive means for providing a lower pressure spread at the higher ambient temperatures to effect switch contact closure than would otherwise be obtained by mere use of a constant pressure switch, the pressure-responsive means and the temperature-compensating means acting in opposition upon the movable switch member, said temperature-compensating means including a thermal bulb disposed in temperature-responsive relation with the controlled gas, said thermal bulb containing a fluid having a pressure-temperature characteristic curve or a volumetric expansion-temperature curve suitable for the desired rapid compensating response at the higher ambient temperatures, whereby pressure and density control of the interrupting gas is obtained over the relatively wide ambient temperature range for effective interrupter operation.

3. A dual-pressure closed-cycle-system compressed-gas circuit interrupter operable over a relatively wide ambient temperature range including a tank structure having a pair of terminal bushings extending therein, an arc-extinguishing assemblage including separable contact means disposed within the tank structure and at least partially supported by the interior ends of the terminal bushings, a high-pressure tank associated with said arc-extinguishing assemblage, blast-valve means synchronized with the separation of said separable contact means to release a blast of gas from said high-pressure tank to assist in arc extinction, the exhausted gas collecting within the general interior of said tank structure, the tank pressure being lower than the pressure within said high-pressure tank, the interrupting ability of the circuit interrupter being dependent upon both the pressure and density of the stored gas, the pressure-temperature characteristics of the interrupting gas causing an increased pressure of the gas at the higher ambient operating temperatures, compressor means for recompressing the exhausted gas within the tank structure and forcing the recompressed gas back into the high-pressure tank for subsequent opening operations of the interrupter, gas-pressure control means including a constant-density gas-control switch for sensing the density of the interrupting controlled gas over said relatively wide ambient temperature range and for regulating the operation of said compressor means, said switch having a pair of cooperable contacts at least one of which is movable, a movable switch member for actuating said one movable switch contact, pressure-responsive means including a pressure connection leading to the high-pressure tank for urging motion of said movable switch member to close the switch contacts upon a drop of pressure of the controlled gas, temperature-compensating means for said pressure-responsive means for providing a lower pressure spread at the higher ambient temperatures to effect switch contact closure than would otherwise be obtained by mere use of a constant pressure switch, the pressure-responsive means and the temperature-compensating means acting in opposition upon the movable switch member, means for pivoting the movable switch member, the pressure-responsive means and the temperature-compensating means acting in opposition on the same side of the pivot point of the movable switch member, said temperature-compensating means including a thermal bulb disposed in temperature-responsive relation with the controlled gas, said thermal bulb containing a fluid having a pressure-temperature characteristic curve or a volumetric expansion-temperature curve suitable for the desired rapid compensating response at the higher ambient temperatures, whereby pressure and density control of the interrupting gas is obtained over the relatively wide ambient temperature range for effective interrupter operation.

4. A dual-pressure closed-cycle-system compressed-gas circuit interrupter operable over a relatively wide ambient temperature range including a tank structure having a pair of terminal bushings extending therein, an arc-extinguishing assemblage including separable contact means disposed within the tank structure and at least partially supported by the interior ends of the terminal bushings, a high-pressure tank associated with said arc-extinguishing assemblage, blast-valve means synchronized with the separation of said separable contact means to release a blast of gas from said high-pressure tank to assist in arc extinction, the exhausted gas collecting within the general interior of said tank structure, the tank pressure being lower than the pressure within said high-pressure tank, the interrupting ability of the circuit interrupter being dependent upon both the pressure and density of the stored gas, the pressure-temperature characteristics of the interrupting gas causing an increased pressure of the gas at the higher ambient operating temperatures, compressor means for recompressing the exhausted gas within the tank structure and forcing the recompressed gas back into the high-pressure tank for subsequent opening operations of the interrupter, gas-pressure control means including a constant-density gas-control switch for sensing the density of the interrupting controlled gas over said relatively wide ambient temperature range and for regulating the operation of said compressor means, said switch having a pair of cooperable contacts at least one of which is movable, a movable switch member for actuating said one movable switch contact, pressure-responsive means including a pressure connection leading to the high-pressure tank for urging motion of said movable switch member to close the switch contacts upon a drop of pressure of the controlled gas, temperature-compensating means for said pressure-responsive means for providing a lower pressure spread at the higher ambient temperatures to effect switch contact closure than would otherwise be obtained by mere use of a constant pressure switch, the pressure-responsive means effecting movement of the movable switch member and hence said one movable switch contact in one direction during high ambient temperature conditions, the temperature-compensating means being connected to the other cooperable switch contact so as to move said other cooperable switch contact in the same direction during such high ambient temperature conditions for temperature compensation, said temperature-compensating means including a thermal bulb disposed in temperature-responsive relation with the controlled gas, said thermal bulb containing a fluid having a pressure-temperature characteristic curve or a volumetric expansion-temperature curve suitable for the desired rapid compensating response at the higher ambient temperatures, whereby pressure and density control of the interrupting gas is obtained over the relatively wide ambient temperature range for effective interrupter operation.

5. A dual-pressure closed-cycle-system compressed-gas circuit interrupter operable over a relatively wide ambient temperature range including a tank structure having a pair of terminal bushings extending therein, an arc-extinguishing assemblage including separable contact means disposed within the tank structure and at least partially supported by the interior ends of the terminal bushings, a high-pressure tank associated with said arc-extinguishing assemblage, blast-valve means synchronized with the separation of said separable contact means to release a blast of gas from said high-pressure tank to assist in arc extinction, the exhausted gas collecting within the general interior of said tank structure, the tank pressure being lower than the pressure within said high-pressure tank, the interrupting ability of the circuit interrupter being dependent upon both the pressure and density of the stored gas, the pressure-temperature characteristics of the interrupting gas causing an increased pressure of the gas at the higher ambient operating temperatures, compressor means for recompressing the exhausted gas within the tank structure and forcing the recompressed gas back into the high-pressure tank for subsequent opening operations of the interrupter, gas-pressure control means including a constant-density gas-control switch for sensing the density of the interrupting controlled gas over said relatively wide ambient temperature range and for regulating the operation of said compressor means, said switch having a pair of cooperable contacts at least one of which is movable, a movable switch member for actuating said one movable switch contact, pressure-responsive means including a pressure connection leading to the high-pressure tank for urging motion of said movable switch member to close the switch contacts upon a drop of pressure of the controlled gas, temperature-compensating means for said pressure-responsive means for providing a lower pressure spread at the higher ambient temperatures to effect switch contact closure than would otherwise be obtained by mere use of a constant pressure switch, means for pivotally mounting the movable switch member, a balancing lever pivoted to said movable pivoted switch member, the pressure-responsive means and the temperature-compensating means acting on opposite sides of the pivot point of the balancing lever, said temperature-compensating means including a thermal bulb disposed in temperature-responsive relation with the controlled gas, said thermal bulb containing a fluid having a pressure-temperature characteristic curve or a volumetric expansion-temperature curve suitable for the desired rapid compensating response at the higher ambient temperatures, whereby pressure and density control of the interrupting gas is obtained over the relatively wide ambient temperature range for effective interrupter operation.

References Cited in the file of this patent

UNITED STATES PATENTS

| 2,092,560 | Runaldue | Sept. 7, 1937 |
| 2,404,597 | McClain | July 23, 1946 |
| 2,421,149 | Segerstad | May 27, 1947 |
| 2,480,538 | Barr | Aug. 30, 1949 |
| 2,549,690 | Klemperer | Apr. 17, 1951 |
| 2,651,691 | Coblentz | Sept. 8, 1953 |
| 2,849,577 | Pfeiffer | Aug. 26, 1958 |
| 2,927,309 | Poitras | Mar. 1, 1960 |

OTHER REFERENCES

A New Concept in Power Circuit Breaker Design Utilizing $SF_6$, R. E. Friedrich, R. N. Yeckley, presented at AIEE Winter General Meeting, New York, N.Y., Feb. 1-6, 1959. AIEE Transactions Paper No. 59-101.